Patented Sept. 29, 1953

2,653,912

UNITED STATES PATENT OFFICE 2,653,912

LIQUID DIELECTRIC COMPOSITIONS

Sidney D. Ross, Williamstown, Moushy Markarian, North Adams, and Mathew Nazzewski, Adams, Mass., assignors to Sprague Electric Company, North Adams, Mass., a corporation of Massachusetts No Drawing. Application October 20, 1950, Serial No. 191,308

2 Claims. (Cl. 252—66)

This invention relates to new and useful chemical compositions and more specifically relates to liquids suitable for use as dielectric materials.

The use of fluorine in organic chemistry has grown extensively in the past decade. Perfluoro compounds of unusual stability and properties have been produced by a number of reaction procedures. However, many of these are characterized by relatively high cost per unit volume or weight, in addition to limited solubility in conventional solvents. The utility of such perfluoro compounds as dielectric materials has been restricted due not only to their high cost, but also due to the relatively low dielectric constant of the materials.

It is an object of the present invention to overcome the foregoing and related disadvantages. A further object is to produce new and useful fluorine containing compounds especially suitable as dielectric materials. A further object is to produce dielectric mixtures which possess relatively high dielectric constants and are liquid over a wide operating range. Additional objects will become apparent from the following description and claims.

These objects are attained in accordance with the invention wherein there is produced a liquid composition comprising the radical dimerization products of trifluoromethyl-aryl compounds which have been subjected to pyrolytic decomposition under conditions which do not affect the aromatic ring.

In a more restricted sense, the liquid dielectric compositions comprise a mixture of at least two organic compounds selected from the class containing compounds substituted with a plurality of fluorine atoms and containing at least two aryl nuclei, hydrogen and fluorine atoms not being substituted on the same or adjacent carbon atoms.

We have discovered novel liquid dielectric compositions consisting of a number of difficultly separable organic compounds each containing at least two aryl nuclei as well as a plurality of fluorine atoms which are not substituted on or adjacent to carbon atoms having hydrogen substituents.

To clarify the structures of the preferred compounds of the invention the following representations are shown:

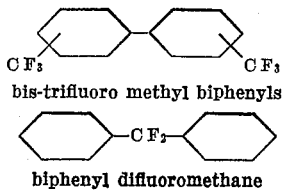
bis-trifluoro methyl biphenyls

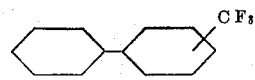
biphenyl difluoromethane

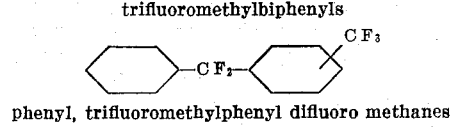
trifluoromethylbiphenyls

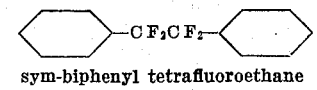
phenyl, trifluoromethylphenyl difluoro methanes

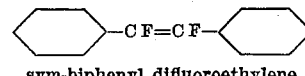
sym-biphenyl tetrafluoroethane

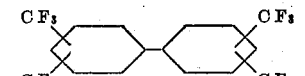
sym-biphenyl difluoroethylene

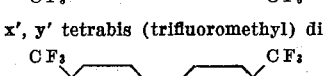
x, y, x', y' tetrabis (trifluoromethyl) diphenyl

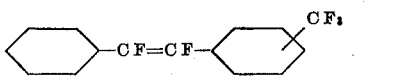
x, y, x' tris(trifluoromethyl) diphenyl

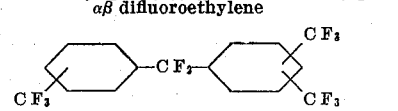
α(x trifluoromethyl phenyl)β(y trifluoromethylphenyl) αβ difluoroethylene

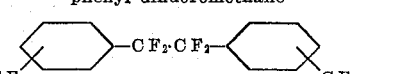
(x-trifluoromethyl 1-phenyl)-(x', x'' bis-trifluoromethyl)- phenyl difluoromethane

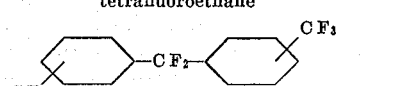
α(x trifluoromethyl phenyl)β(y trifluoromethyl phenyl) tetrafluoroethane (x trifluoromethyl phenyl)(x' trifluoromethyl phenyl) difluoromethane It is to be understood that in place of phenyl nuclei, one or both of the phenyl rings may be replaced by a naphthyl, anthracyl, or other more complex hydrocarbon nuclei. Further, it is contemplated that each of the aryl rings may have additional substituents. In instances where low electrical loss factors are not of importance polar substituents may be included.

It is recognized that certain of the compounds defined herein are not new as individual materials, for example, bis trifluoromethyl benzenes are disclosed in prior application bearing Serial Number 785,533, filed by Moushy Markarian on November 12, 1947, now abandoned. However, the dielectric mixtures described herein are believed to be new and, in particular, overcome many disadvantages of prior compounds such as narrow liquid range, high cost and the like.

The liquid mixtures of the invention are normally produced in a single chemical reaction, through dimerization of the radicals produced by homopolar cleavage of aliphatic bonds of trifluoromethyl substituted aryl compounds. The radicals may be produced by subjecting the vapors of the starting material to a metal filament held at a temperature from about 300° C. to about 1500° C. and the dimerization thereupon occurs in the gaseous state between various radicals. The final product will normally contain a small amount of unreacted starting materials, as well as minor quantities of undesired by-products which do not conform to the general structural formula defined herein. Both of these may be removed readily by distillation, being lower boiling than the desired compounds.

As examples of the formation of the radicals for the dimerization reaction, listed below are those formed from benzotrifluoride and bis-trifluoromethyl benzenes, which are preferred starting materials:

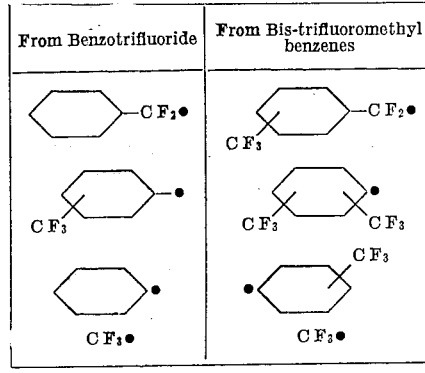

Any one of these radicals can dimerize with another radical, either the same or dissimilar, the dimerization resulting in the formation of a single bond at the junction of the dots (•). The primary products resulting from dimerization of the radicals noted above have been previously listed as preferred compounds of the invention. The exceptions to this, however, are the ethylene compounds listed; these are secondary dimerization products probably resulting from the formation of the corresponding ethane followed by dehalogenation in contact with the filament.

It is to be understood that the individual compounds disclosed herein may be made independently and then mixed to form the wide range liquid dielectric compositions or used per se.

The examples which follow will illustrate preparation of the liquid compositions of the invention.

Example 1

An apparatus was constructed with a copper flask for vaporizing the raw material above which was placed in a series of 28 Nichrome filaments each 2½″ in length and ½″ wide in parallel. Above the filament reaction chamber a copper reflux condenser was provided. 1000 grams of benzo trifluoride was introduced into the flask and heated to reflux temperature. The filament was heated by applying about 3 volts from a high current power supply, with filament temperature being about 875° C. The liquid was refluxed thru the hot filament for a total of 8 hours. A total volume of about 54.8 liters of uncondensed gas was evolved during the reaction. At the end of this time the condensed reaction mixture was distilled to give about 263 grams of unreacted benzotrifluoride about 324 grams of product boiling between about 130 to 135° C. at 15 mm. with a small amount of tar. The product was a mobile, yellow liquid.

A small sample of the product fraction was removed for analysis, and other small samples were used for structural studies, as indicated in later paragraphs. The bulk of the product was carefully fractionated in a helices packed Todd still, with the following results:

| Fraction | Volume, cc. | Boiling Point, °C., @ 12 mm. | $n_D^{25}$ |
| --- | --- | --- | --- |
| 1 | 14 | 111 | 1.5058 |
| 2 | 6 | 115 | 1.5199 |
| 3 | 14 | 116 | 1.5245 |
| 4 | 18 | 117 | 1.5250 |
| 5 | 13 | 118 | 1.5257 |
| 6 | 24 | 120–121 | 1.5149 |
| 7 | 25 | 123 | 1.5082 |
| 8 | 14 | 124 | 1.5039 |
| 9 | 32 | 125–126 | 1.4971 |
| 10 | 18 | 127 | 1.4930 |
| 11 | 16 | 129 | 1.4918 |

The wide range of refractive indices within the relatively narrow boiling range indicates the presence of a number of compounds.

The product fraction previously referred to was hydrolysed with acid, the di-acid chlorides formed and, finally, the dimethyl esters formed. Dimethyl esters with melting points of 216–217° C., 102.5–103.5° C. and 96–98° C. were obtained, indicating the presence of p, p'-; m, m'-; and m, p' bis-trifluoromethyl biphenyls in the product fraction.

Another sample was hydrogenated in absolute alcohol with a platinum catalyst at low pressure. Loss in hydrogen pressure and removal of the yellow color, leaving a water white product indicated hydrogenation of an unsaturated linkage, and suggested the presence in the original product, of sym-biphenyl bifloroethylene.

Carbon, hydrogen and fluorine analyses of the product fraction gave the following results:

C—64.82%, 65.00%
H—3.44%, 3.31%
F—26.48%, 26.64%

Calculated results for the compounds whose presence was indicated in the product are

| | CF₃—⬡—⬡—CF₃ | ⬡—CF₂CF₂—⬡ | ⬡—CF=CF—⬡ |
| --- | --- | --- | --- |
| Percent C | 57.92 | 66.20 | 77.75 |
| Percent H | 2.78 | 3.96 | 4.65 |
| Percent F | 39.30 | 29.84 | 17.59 |

Example 2

The reaction procedure outlined above was carried out, starting with 1000 grams of a mixture of meta and para bis-trifluoromethyl benzenes. Gas evolution totaled about 28 liters during the course of the 6½ hour reaction. Initial distillation gave 408 grams of recovered starting material and 98 grams of product, B. P. above 125° C. @ 13 mm. The product was a yellowish mobile liquid.

The products obtained in Examples 1 and 2 were measured for electrical properties.

| Material | Temp., °C. | Dielectric Constant | Dissipation Factor, Percent | Frequency |
|---|---|---|---|---|
| Ex. 1 | 25 | 6.2 | 0.03 | 1,000 cycles. |
| Ex. 1 | 100 | 4.2 | 0.2 | Do. |
| Ex. 2 | 25 | 4.13 | .34 | 1 megacycle. |

The liquid compositions of the invention are useful not only as dielectric fluids, for capacitor impregnation, etc., but also as plasticizers for resins, heat transfer agents, hydraulic fluids and the like. They are quite stable at elevated temperatures and to chemical deterioration. Where optimum stability is desired, the liquid mixture may be hydrogenated, at low pressure, to remove unsaturated linkages.

It is to be understood that the individual components of the mixture may be separated by fractional distillation; ordinarily, however, they are left together, in order that a maximum liquid range may be obtained. More complex mixtures may be produced by reacting a plurality of starting materials, as, for example, a mixture of benzotrifluoride and the three isomeric bis-trifluoromethyl benzenes. The metal used for the filament may be selected to give optimum yield of the desired product.

As many widely different embodiments of this invention may be made without departing from the spirit and scope hereof, it is to be understood that the invention is not limited to the specific embodiments hereof except as defined in the appended claims.

We claim:

1. A liquid dielectric composition consisting essentially of the condensation products of radicals obtained by the pyrolytic decomposition of starting materials selected from the group consisting of benzotrifluoride and bis-trifluoromethyl benzenes at a glowing filament at from 300 to 1500° C.

2. A process for producing liquid dielectric compositions which comprises decomposing compounds selected from the class consisting of benzotrifluoride and bis-trifluoromethyl benzene at a glowing filament at from about 300° C. to about 1500° C. so as to cause pyrolytic decomposition of said compounds into radicals and subsequent condensation of the latter without destroying the aromatic rings.

SIDNEY D. ROSS.
MOUSHY MARKARIAN.
MATHEW NAZZEWSKI.

References Cited in the file of this patent

UNITED STATES PATENTS

| Number | Name | Date |
|---|---|---|
| 2,063,979 | Booth | Dec. 14, 1936 |
| 2,414,330 | Renoll | Jan. 14, 1947 |
| 2,174,512 | Holt | Oct. 3, 1939 |
| 2,522,968 | Simons | Sept. 19, 1950 |